(12) United States Patent
Beecroft (10) Patent No.: US 9,203,739 B2
(45) Date of Patent: Dec. 1, 2015

(54) ADAPTIVE ROUTING APPARATUS AND METHOD

(75) Inventor: Jon Beecroft, Bristol (GB)

(73) Assignee: Cray UK Limited, Reading (GB)

( * ) Notice: Subject to any disclaimer, the term of this patent is extended or adjusted under 35 U.S.C. 154(b) by 0 days.

(21) Appl. No.: 13/703,293

(22) PCT Filed: Jul. 15, 2011

(86) PCT No.: PCT/GB2011/051334
§ 371 (c)(1),
(2), (4) Date: Jan. 12, 2013

(87) PCT Pub. No.: WO2012/010870
PCT Pub. Date: Jan. 26, 2012

(65) Prior Publication Data
US 2013/0208727 A1    Aug. 15, 2013

(30) Foreign Application Priority Data

Jul. 21, 2010 (GB) .................................. 1012231.5

(51) Int. Cl.
| | | |
|---|---|---|
| *H04L 12/707* | (2013.01) | |
| *H04L 12/54* | (2013.01) | |
| *H04L 12/937* | (2013.01) | |
| *H04L 12/863* | (2013.01) | |
| *H04L 12/933* | (2013.01) | |

(52) U.S. Cl.
CPC ................ *H04L 45/22* (2013.01); *H04L 12/56* (2013.01); *H04L 49/254* (2013.01); *H04L 47/6225* (2013.01); *H04L 49/101* (2013.01)

(58) Field of Classification Search
USPC .............. 370/355, 386, 388, 389, 395.4, 400, 370/401, 411, 412, 414, 416, 419, 422, 423, 370/461
See application file for complete search history.

(56) References Cited

U.S. PATENT DOCUMENTS

| | | | | |
|---|---|---|---|---|
| 6,138,185 A | * | 10/2000 | Nelson et al. | .................... 710/33 |
| 6,449,283 B1 | | 9/2002 | Chao et al. | |
| 6,667,984 B1 | | 12/2003 | Chao et al. | |
| 7,133,399 B1 | * | 11/2006 | Brewer et al. | ................. 370/360 |
| 7,525,978 B1 | | 4/2009 | Tabatabaee et al. | |
| 2002/0176431 A1 | * | 11/2002 | Golla et al. | .................... 370/412 |
| 2003/0165151 A1 | | 9/2003 | Chao et al. | |

(Continued)

FOREIGN PATENT DOCUMENTS

| | | |
|---|---|---|
| EP | 1052815 A2 | 11/2000 |
| EP | 1233580 A1 | 8/2002 |

(Continued)

OTHER PUBLICATIONS

Xiao Zhang et al., An efficient scheduling algorithm for combined input-crosspoint-queued (CICQ) switches; Global Telecommunications Conference, 2004; Globecom '04; IEEE Dallas, Texas, USA Nov. 29 to Dec. 3, 2004, vol. 2, Nov. 29, 2004, pp. 1168-1173.

*Primary Examiner* — Edan Orgad
*Assistant Examiner* — Saumit Shah
(74) *Attorney, Agent, or Firm* — Craig J. Lervick; Larkin Hoffman Daly & Lindgren, Ltd.

(57) ABSTRACT

A network switch adaptive routing mechanism is disclosed along with an associated method of data routing. In particular, a mechanism is disclosed that enables adaptive routing selection within a crossbar switch.

14 Claims, 6 Drawing Sheets

(56) References Cited

U.S. PATENT DOCUMENTS

| | | |
|---|---|---|
| 2005/0129043 A1* | 6/2005 | Konda .................... 370/412 |
| 2005/0135355 A1 | 6/2005 | Muthukrishnan et al. |
| 2005/0152352 A1 | 7/2005 | Jun et al. |

FOREIGN PATENT DOCUMENTS

| | | |
|---|---|---|
| WO | WO-00/28701 A1 | 5/2000 |
| WO | WO-03/017595 A1 | 2/2003 |

* cited by examiner

ADAPTIVE ROUTING APPARATUS AND METHOD

BACKGROUND

The present invention generally relates to a network switch adaptive routing mechanism an associated method of data routing. In particular, the present invention is concerned with a mechanism enabling adaptive routing selection within a crossbar switch and the associated method of data routing.

Network switches, also known as a network bridges, process and route data traveling across a network. There are two types of route available for connecting across a switch, namely fixed routes and adaptive routes. A data packet arriving with a fixed route must wait for the switch output described by the fixed route to become free before it can be travel across the switch. A data packet arriving at a switch having an adaptive route has a selection of possible outputs that can be connected to. Adaptive routes take advantage of the availability of multiple routes through the network and are a recognized method for improving the performance of a switch network when the network transports random traffic patterns. Adaptive routing is an important factor in producing a congestion free network. If a packet has a choice of routes then it is more likely to find one of a number of outputs free than it would if it were only able to select to a particular output.

If a switch network has more than one possible route from a source port to a destination port then adaptive routes can be used wherever it is reasonable to route in a different way. Some networks are very rich in connectivity giving many alternatives routes from one source to another destination.

Figure 1:
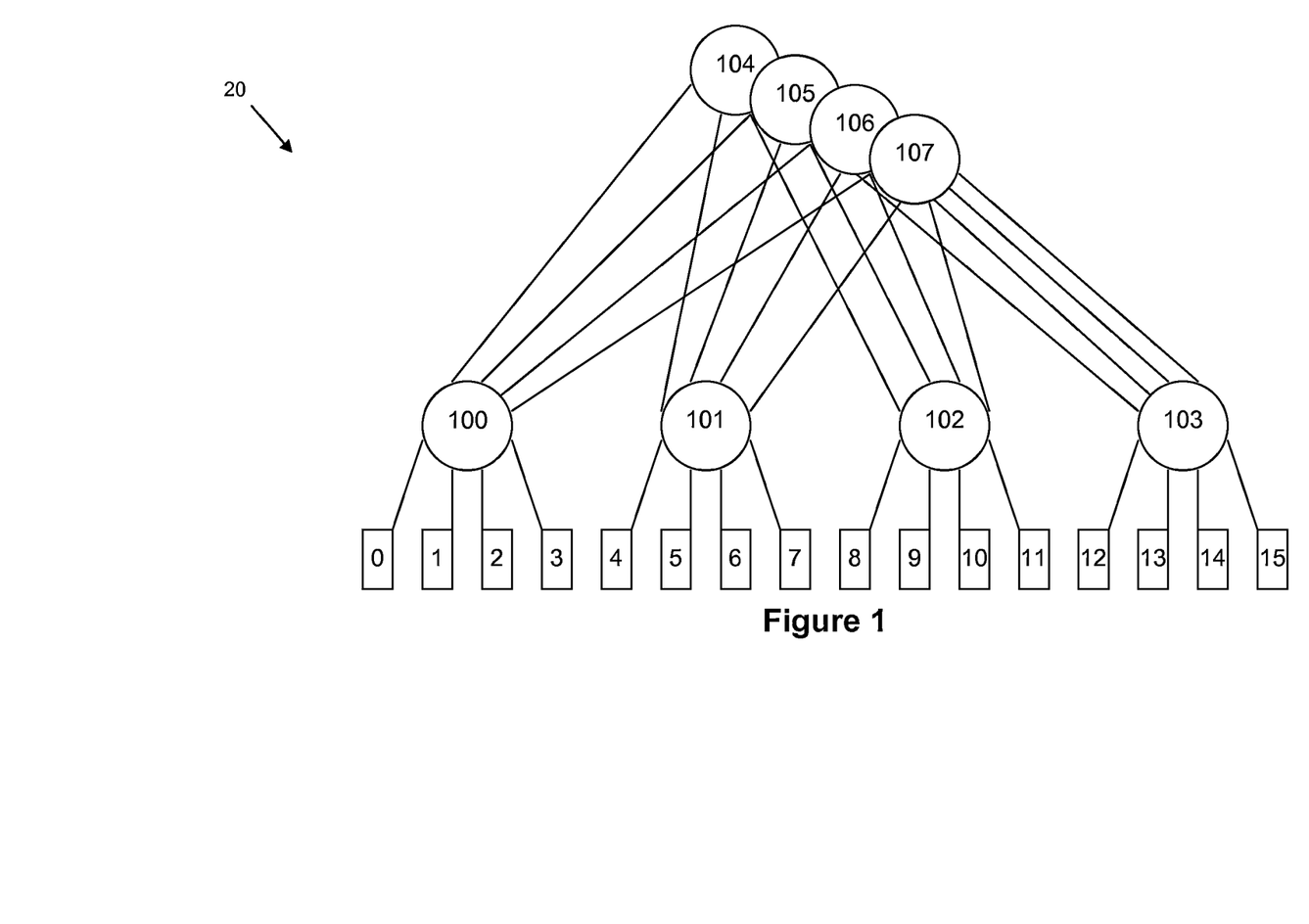
FIG. 1 is a schematic diagram of a known network.

There are many different types of network topology suitable for adaptive routing. An example of such a network topology is shown in FIG. 1 and is called a Fat Tree or Clos network. In FIGS. 1, 0 to 15 represent endpoints in a network 20 and 100 to 107 represent switches within the network 20. A data packet moving from endpoint 1 to endpoint 11 must pass through switches 100 and 102 but can go via any of the switches 104 to 107.

Within network 20, adaptive routing can be performed by switch 100 for the data packet moving from endpoint 1 to endpoint 11. In this case the adaptive route would have an output selection for all the links connecting to switches 104, 105, 106 and 107. If the outputs of switch 100 to switches 104, 105 and 107 are all busy sending other data packets from endpoints 0, 2 and 3 then the an adaptive route would chose to send the data packet from endpoint 1 to switch 106 since it is the only suitable free connection able to accept the data.

Figure 2:
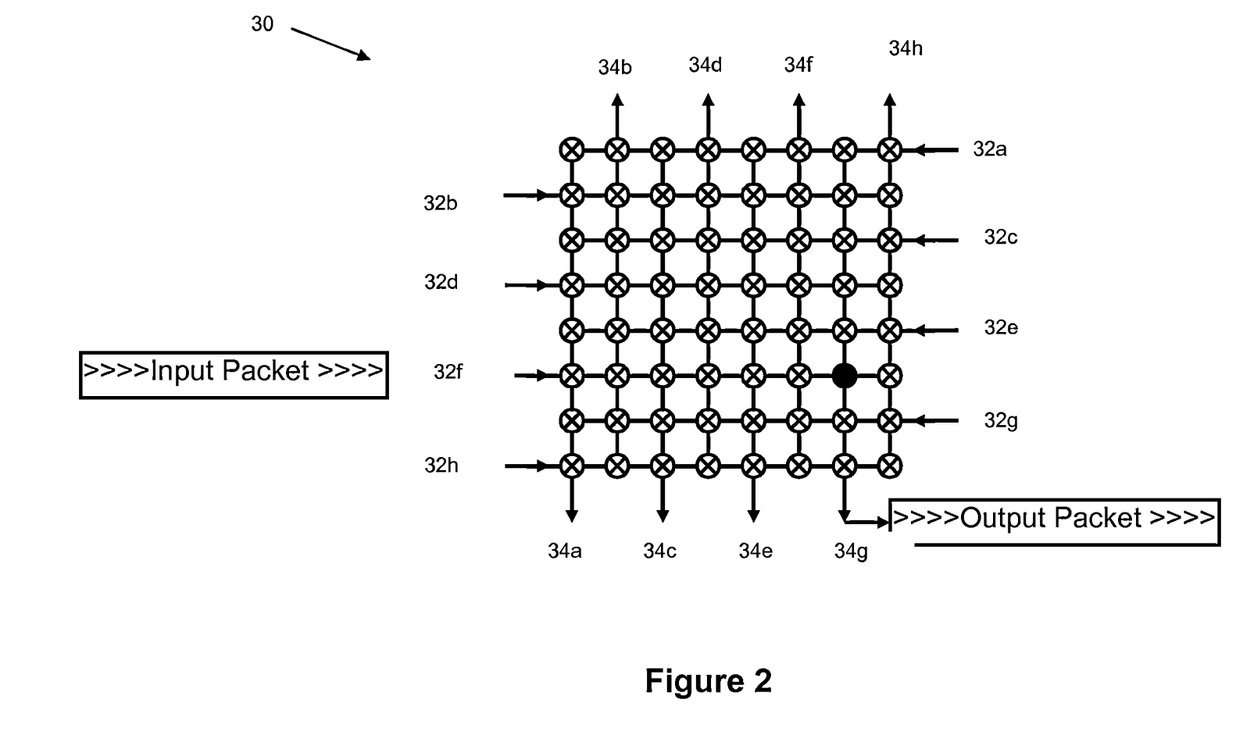
FIG. 2 is a schematic diagram of a known crossbar switch.

Many network switches are based on some form of crossbar connection structure. The crossbar connection structure performs the function of connecting any input into the crossbar to any output from the crossbar. An example of a crossbar switch 30 is shown in FIG. 2. In this diagram of a crossbar switch inputs 32a-32h form the rows and the switch outputs 34a-34h are connected along the columns. The switch connection points 36aa-36hh are controlled data switches that connect the inputs 32a-32h to the outputs 34a-34h. In crossbar switch 30 there are a total of sixty four switch connection points 34. Concurrent communications can take place within crossbar switches. Any input 32 can make a request to connect to any output 34. In the case of a multicast operation any input 32 can make a request to connect to a collection of outputs 34a-34h. In this example, switch point 32f is connected to output 34g by switch point 36fg which is shown as a solid dot to clarify that it is connected and not available for connection to any other input or output at that time. The remaining unconnected switch points 36 are shown as a cross in a circle. At the end of the transfer of a packet of data across the switch 30, the output 34g will become free to connect to another switch input 32.

When the situation arises that a number of inputs, say 32a-d are all requesting to the same output, say 34b, an arbitration operation is required to select which of inputs 32a-d will next connect to output 34b. For this purpose, a crossbar switch can be provided with an arbiter for each output of the crossbar. To ensure good network behavior, it is very important that the connection options are correctly prioritized and that requests of the same priority are dealt with fairly in such an arbitration operation.

Figure 3:
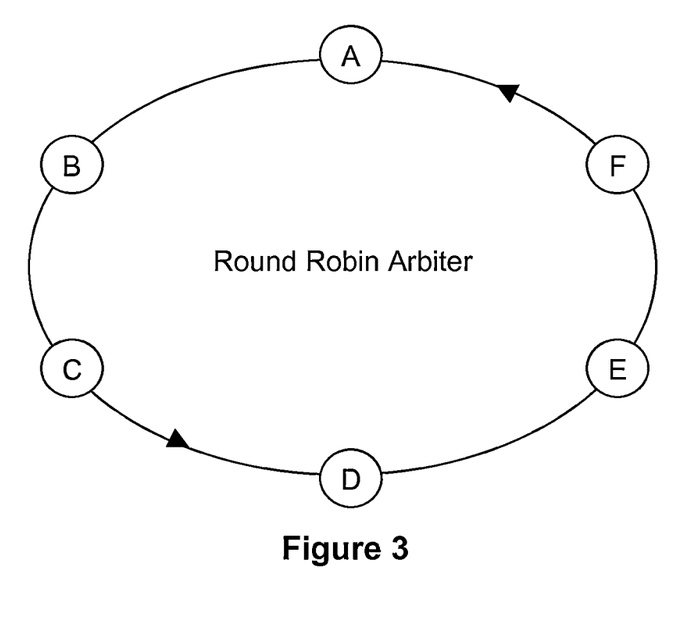
FIG. 3 is a schematic diagram of prioritization in a known arbiter.

If multiple inputs are requesting the same output, with each input having a different priority level, ensuring connection decisions are well prioritized can take a number of data transfer cycles. In such a situation, the requested switch output establish which input request has the highest priority and then, if more than one input has that same highest priority, an unbiased selection has to be made to ensure fairness in connection selection. There are a number of different types of arbiter that can be used to perform a fair selection. One type is a Least Recently Used (LRU) arbiter. This type of arbiter will always select the valid request that was last selected the least recently of all the valid requests being made. This type of arbiter gives good results but can be difficult to implement over a large structure such as a crossbar because many bits of state are required to hold the complete history of previous connections, especially with many inputs, and this state cannot be physically distributed over the whole crossbar as all inputs need to reference all of the state. The amount of state required to fully implement a fast LRU arbiter does not scale linearly with the number of inputs. Another type of arbiter which is considered to perform a fair selection is called a Round Robin arbiter. This type of arbiter uses a moving priority selection where the last successful connection is given the lowest priority for the next arbitration. It needs far fewer states and can be implemented in a distributed arbiter. In FIG. 3 a schematic diagram illustrates an example of prioritization in a round robin arbiter. In this example, there are six requesting inputs A to F. The arrows indicate the direction of roaming priority followed by the round robin arbiter. Assuming inputs A, C and D are asserting a request for connection and that input E was the last requestor to make a successful connection then, in this case, input A will have the highest priority and input D the lowest priority. This would mean that input A would be the next to connect to the desired output. After this connection between input A and the requested output was made and the transfer of data between the two completed, input A would become the lowest priority requestor if it continued to assert its request and input C would be the next input to be connected to the desired output. If these three requestors, input A, C and D, continued to assert their requests then the arbiter would choose them in the order A, C, D, A, C, D, A . . . and so on.

As can be seen from this illustration, round robin arbiters have a roaming priority selection mechanism. Roaming priority is however different from a priority assigned to with input connection request. Many network protocols include a priority mechanism to guarantee progress for important packets. The IEEE 802.1Q Ethernet standard includes an absolute priority value that appears in the Ethernet header. Typically high priority packets may be used for time critical system services. Sometimes this assigned priority may be dynamically changing; an example of this is if the assigned priority is associated with the age of the packet within the network such that older packets are more important than younger packets. If older packets are prioritized over younger packets then the maximum age of all packets within the whole network is significantly reduced. This can deliver better and more predictable application performance. Some network protocols work in a manner that both absolute priority and age related priority are included in the assigned priority to give the best network performance but absolute priority would be given preference over the priority associated with age. Absolute packet priority along with age priority would supersede the priority mechanism of a round robin arbiter. The priority mechanism within the round robin arbiter will only provide a fair result for all the highest priority/oldest packets making simultaneous requests.

Inclusion of an adaptive output selection for the inputs adds further complexity to the process. Adaptive output selection is typically implemented with a mechanism that attempts to connect to one of the possible outputs and then, if that fails, will back out of the connection attempt and then try another one of the possible outputs. It then continues to cycle through all the possible outputs until it finds one prepared to connect. If many inputs are all performing this operation at the same time and there are many outputs to choose from then this mechanism can fall apart and produce some terrible latencies for some connections. For example if we have a crossbar with 32 inputs and 32 outputs, the first input to make a request to the outputs will find a free output to connect with because none of them is currently connected. The second is very likely to find a free output because only 1 of the 32 outputs is currently connected to the first. However, when most of the outputs are already connected with an input then the chances of randomly selecting a free output can dramatically reduce. In our example there would only be a 1 in 32 chance when 31 connections have already been made and the final input is trying to find the one remaining free output. That input is then left with another problem. Should it withdraw its request to try another output or should it stay with the current selection in the hope it is about to finish transmitting the current packet and then be selected. If it withdraws then again it only has a 1 in 32 chance of guessing the one free output and it has no way of determining whether it is about to connect with its current selection or if it has a substantial wait before it will be able to connect with its current selection.

Low uncongested latency is important for network performance but a low maximum latency in a busy or congested network is far more important. One of the many ways to reduce maximum latency is to ensure that no opportunity to make a connection is wasted.

While an input is searching for a suitable connection to an appropriate output, it is not transmitting data. This causes a reduction in bandwidth that cannot be recovered later. Likewise, bandwidth is lost if an output completes the transmission of a data packet in one cycle and does not start transmitting a newly arbitrated packet from another input in the next cycle. A crossbar switch, with many inputs and outputs and high bandwidth wide data buses, can be a large structure making timing closure of the logic gate implementation on an ASIC difficult. This is usually addressed by pipelining the connection requests over one or more cycles.

It can therefore be seen that there is a need for an arbiter that can switch from one connection to another in a single cycle. It would be convenient if such an arbiter could also be able to do this while still maintaining fairness and, if needed, honoring any priority requirements.

SUMMARY

An object of the present invention is to obviate or mitigate at least one of the aforementioned problems.

According to one aspect of the present invention, there is provided a network switch device for use in a data network, the switch device comprising a first plurality of input ports for receiving data packets, a second plurality of output ports for transmitting data packets, and a switch network comprising a third plurality of interconnected switch elements arranged to enable connection of any of the input ports to any of the output ports, each switch element being operable to connect one of the input ports with one of the output ports, each output port including an output arbiter operable to determine which switch element is to connect an input port to that output port, the output arbiter being connected with those switch elements which are connected with the output port concerned, at least one input port including an input arbiter operable to determine which switch element or elements are to complete a connection from the input port concerned to an output port, and at least one input port being operable to transmit at least two switch request signals to at least two switch elements, wherein each output arbiter is operable to receive a switch request signal from a switch element connected with an associated output port, to determine to which input port the output port is to connect, in dependence upon such a received switch request signal, and to signal connection status information via said switch elements to that input arbiter associated with said input port, the input arbiter being operable to select only one output port in dependence upon received connection status information, thereby to complete a single connection from said input port to a single output port.

Such a device enables parallel adaptive routing arbitration that can be completed in a single clock cycle of the system, thereby reducing the amount of time taken for the switch connection to be made. This time reduction can improve the performance of the switching network, for example by reducing latency. Such a device enables switching from one route to another to be completed in a single system clock cycle.

In one embodiment, each input port comprises route decode logic operable to determine a selection of outputs ports to which an incoming data packet can be routed, and to generate appropriate switch request signals from such a determined selection.

Each input arbiter may be a round robin arbiter. Each output arbiter may be a round robin arbiter.

In one embodiment, each output arbiter is operable to transmit an acceptance indicator value to the input arbiter, and the input arbiter is operable to receive an acceptance indicator value, and to cause a switch element to connect the input port to the output port associated therewith.

According to another aspect of the present invention, there is provided a method of routing data packets in a data network which includes a switch device comprising a first plurality of input ports for receiving data packets, a second plurality of output ports for transmitting data packets, and a switch network comprising a third plurality of interconnected switch elements arranged to enable connection of any of the input ports to any of the output ports, each switch element being operable to connect one of the input ports with one of the output ports, each output port including an output arbiter operable to determine which switch element is to connect an input port to that output port, the output arbiter being connected with those switch elements which are connected with the output port concerned, at least one input port including an input arbiter operable to determine which switch element or elements are to complete a connection from the input port concerned to an output port, and, at least one input port being operable to transmit at least two switch request signals to at least two switch elements, the method comprising the steps of receiving, at the switch elements, a switch request signal from an input port of the switch device, passing such received switch request signals to the output arbiter of the output port to which the switch elements are connected, receiving, at the output arbiters, a switch request signal from a switch element connected with the associated output ports, determining to which input port the output ports are to connect in dependence upon such received switch request signals, returning connection status information via the associated switch elements to that input arbiter associated with said input port, and selecting, using an input arbiter, only one output port in dependence upon such received connection status information to complete a single connection from said input port to a single output port.

BRIEF DESCRIPTION OF THE DRAWINGS

These and other aspects of the present invention will be more clearly understood from the following description and, by way of example only, and with reference to the following figures, in which.

DETAILED DESCRIPTION

Figure 4:
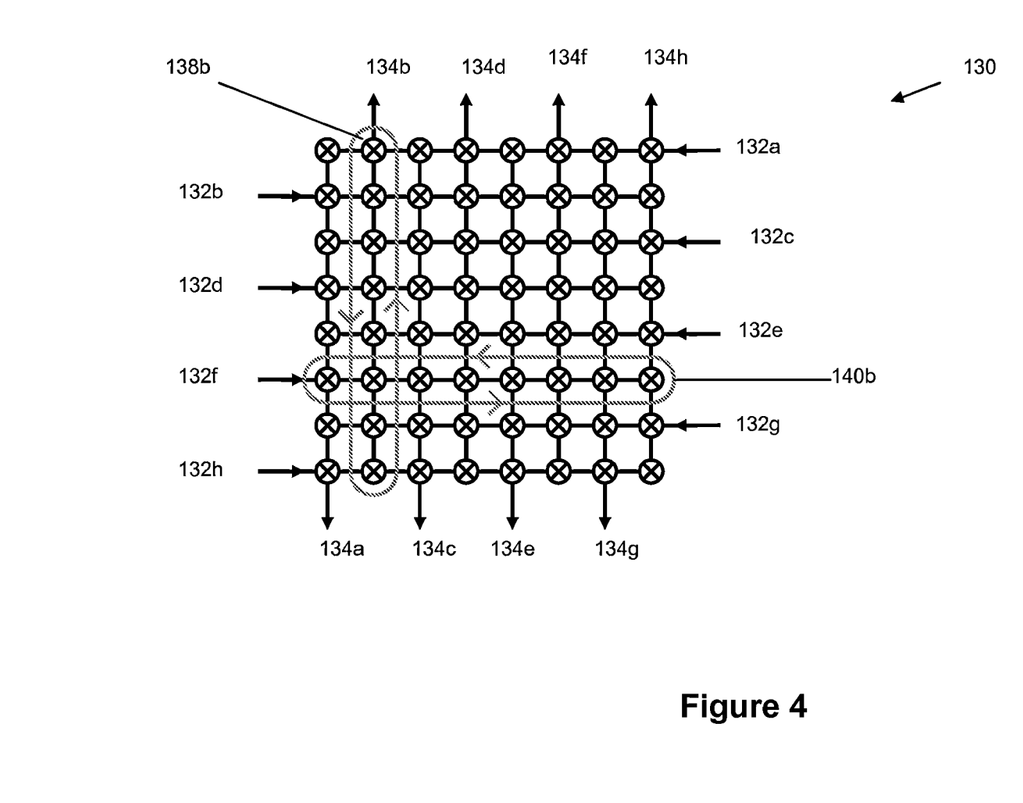
FIG. 4 is a schematic diagram of a crossbar having input arbiters and output arbiters according to a first embodiment of the present invention.

With reference to FIG. 4, there is provided a network switch, in this case crossbar switch 130. The switch inputs 132a-h form the rows of the crossbar switch 130 and the switch outputs 134a-h form the columns of the crossbar switch. At each cross over point in the matrix of inputs 132a-h and outputs 134a-h there is provided a switch connection 136aa-hh. Each switch connection 136aa-hh is a controlled data switch that connects one of inputs 132a-h to one of outputs 134a-h.

Each output 134a-h is provided with an arbiter, in this case a round robin 138a-h. For the sake of simplicity, only one output arbiter 138b is shown as being provided to output 134b in FIG. 4, however it will be clearly understood that each other output 134a and 134 c-h is similarly provided with a corresponding output arbiter 138a and 138c-h (not shown).

Each input 132a-h is provided with an input arbiter, in this case a round robin adaptive routing arbiter 140a-h. For the sake of simplicity, only one input arbiter 140b is shown as being provided to input 132b in FIG. 4, however it will be clearly understood that each other input 132a and 132c-h is similarly provided with a corresponding input arbiter 140a and 140c-h (not shown).

As can be seen, the direction of the adaptive routing round robin input arbiter 140b is orthogonal to the direction of the switch output round robin arbiter 138b.

The crossbar switch arrangement 130 shown in FIG. 4 provides a connection mechanism that allows concurrent adaptive routing selections of arbitrary connections to switch outputs 134a-h from all of the switch inputs 132a-h within a single data transfer cycle. The connection mechanism allows multiple switch inputs, in this case say switch inputs 132a-c, to make requests concurrently to all the possible switch outputs, in this case, for example, switch outputs 134a-f in an adaptive route selection. Crossbar logic will then select the best output for each of the inputs to connect with. The connection mechanism also allows all the inputs 132a-h of the crossbar switch to perform this operation to all the outputs 134a-h at the same time ensuring that each input will connect to only one output. The dual arbitration process allows the outputs to switch from one input stream to another without any wasted cycles.

Figure 5:
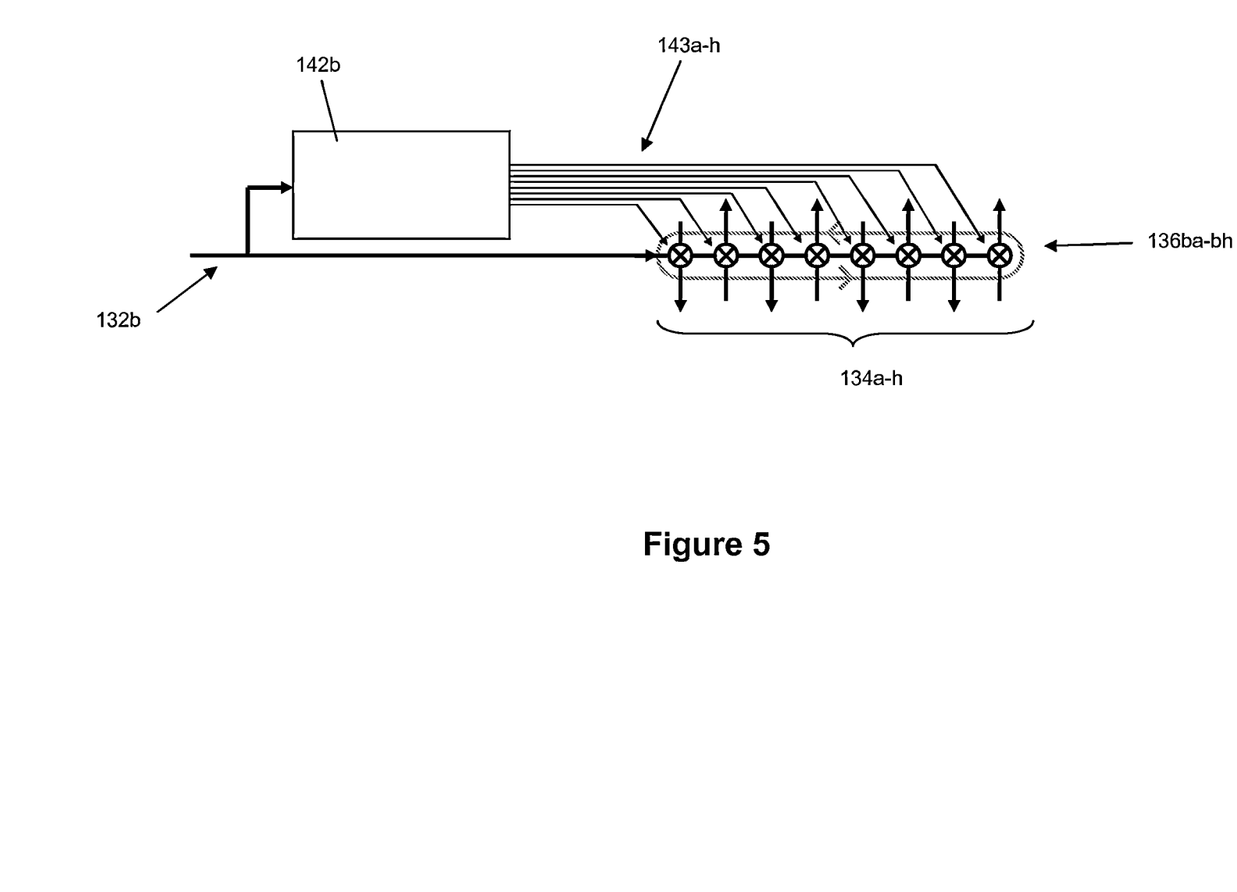
FIG. 5 is a schematic diagram of a detail of an input arbiter on a input of a crossbar switch of FIG. 4.
Figure 6:
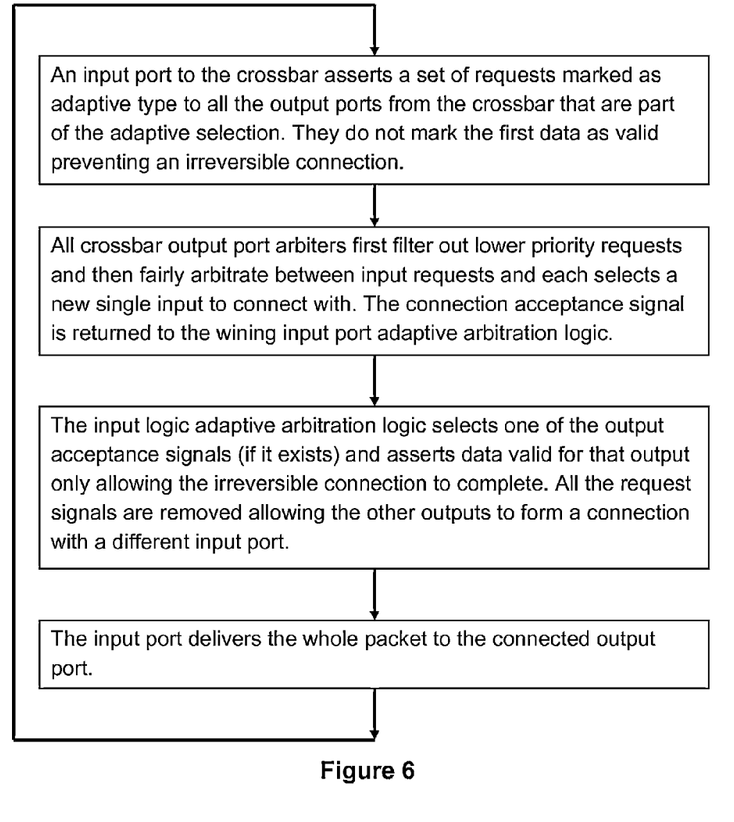
FIG. 6 is a flow chart of a method according to an example.

In FIG. 5 there can be seen, in detail, the schematic layout of a crossbar switch input 132b and associated round robin arbiter 140b which will perform the adaptive routing of the connection mechanism. The input switch port is provided with route decode logic 142b which has a connective wire 143a-h to each of the switch connection points 138ba-bh.

With reference to FIGS. 4 and 5, a data packet having an adaptive route arrives at the input switch 132b, the route decode logic 142b obtains a route value from a header of the data packet. The route decode logic 142b uses the route value, which will indicate the adaptive route options, in this case outputs 134a-h, and generates the appropriate switch request signals with one request signal generated for transmission on each connective wires 143a-h to each appropriate switch connections 136ba-bh. A type value is also generated to indicate that an adaptive selection request is being made. The type is sent with the request to the cross connection point and is used to differentiate between adaptive requests, normal point to point requests and multicast requests. It will be clearly understood that whilst the above example provides detail of the arrival of a data packet at the input switch 132b, in parallel with this, data packets could similarly be arriving at switch inputs 132a, 132c-h Acting in parallel with those generated by each of the other switch inputs, the asserted request signal transmitted on each connective wires 143a-h attempts to win the arbitration for all the outputs they connect to but the data valid signal is masked, depending on the request type, to prevent multiple committed connections to the outputs in the set. If the request is a normal point to point request where only one output is being requested the data valid signal does not need to be masked because an acceptance from the output arbiter is all that is needed to complete the request. If the request type is an adaptive request then the data valid signal should be masked to prevent multiple connections to any of the outputs in the adaption mask until only one can be selected. If the request type is for a multicast connection then again the data valid signal must be masked until all the outputs in the multicast output selection mask have signaled their ability to connect to this input port.

Each of the output arbiters will receive the request signals coming from all of the separate inputs and inspect them. After the output arbiter has applied any priority selection rules, one of the requesting inputs is selected as having won the arbitration to make the next connection. Each of the output arbiters that appear in the input adaptive route selection mask will pass back an acceptance status signal directly to the appropriate input port logic. In this case, the acceptance status signal is a simple "will connect"! "will not connect" status indicator.

The returned acceptance status data is used by the input to select the best output the adaptive selection request should use. If no outputs return a "will connect" status then the requests can remain asserted until one of more do. If only one output has returned a "will connect" status, then that particular output is chosen. If multiple outputs return a "will connect" status to the input, the available outputs are provided to the input adaptive route round robin arbiter for selection to win arbitration and be chosen for the next connection. It is very important for network performance that this selection is always fair and never favors one output over others during a longer period time as the favoring of one output would generate congestion further into the network in links associated with this connection. It will be appreciated that the adapting routing arbiter of each input to the switch will be performing this process at the same time.

Upon selecting the best output for connection, the input adaptive routing round robin arbiter then unmasks the data valid signal for the data packet to that selected output thus allowing a full connection via the appropriate switch connection point to the chosen switch output. The connection mechanism then actions the switch input to drop the request to all the outputs which appeared in the original adaption selection including the now connected output and in so doing allows the output arbiters for the other outputs to choose another input.

It will be clearly understood that the output arbiters of the connection mechanism may provide a more sophisticated acceptance status to the switch inputs. For example, in a second embodiment of the connection mechanism, the acceptance status signal generated by each of the output arbiters is a value with a number of states indicating the "goodness" of the request to this output. This "goodness" state can range from "excellent" through "poor" to "no connection". An "excellent" acceptance status signal response could indicate to the input that the output is completely free with no congestion ahead of it and that it is available for immediate connection. A "poor" acceptance status signal response could be returned from an output that either may be able to accept the request in the near future or would, if accepted, be likely to direct the data packet into a congested part of the network causing the data to be blocked in subsequent switches. A "no connection" acceptance status signal response could indicate that the output has recently started transmission of other data and is unlikely to be free for connection for some time. In this embodiment, the "goodness" factor acts as a priority value on the adaptive routing round robin input arbiter wherein the acceptance signals received having "excellent" status would be selected as the highest priority. If multiple requests received acceptance responses with the same highest priority "goodness" factor then the input arbiter makes a selection based on the principles of fair arbitration.

The connection mechanism is further able to "pipeline" the connection process. For example, in a third embodiment of the connection mechanism, a new input request from a data packet in transit to a switch input is presented ahead of the packet data body. This enables the request signals to be provided, in advance of the data packet arrival at the switch input, to the output arbiters. The output arbiters can then determine, ahead of switching to a new data packet, which new requesting input should be selected for connection to and, by implication, which requesting inputs should be rejected.

If the arbiter of the selected output determines which requesting input is to be selected while the tail of the previous packet, possibly from a different input, is still being transmitted through the selected output, this will allow a seamless switch of the transfer from the selected input to the new adaptively selected packet without the output having any idle cycles. Presenting the request signals from the input before that input has finished transmitting the previous packet means that no bandwidth is wasted on the input switch either.

If, while an input is waiting for its selected output choice to become free, a better choice presents itself then that input is able to change its output selection to the better choice provided no data has been sent on the old selection. It would do this by masking the valid for the old selected output and once a connection to the old output is not possible the new preferred output data valid can be unmasked allowing the new connection to proceed when possible. This is only possible if the output had not finished sending a previous packet while the valid is being masked and had not signaled its readiness to start a new connection.

Likewise if, while an input A is waiting for its selected output Z choice to become free, another input B with a higher priority than the first input A requests the same output Z then the first input A is again able to change its output selection to one output Y with perhaps a poorer goodness factor allowing the higher priority input B to win the request to the best output Z. This would happen because the old output Z will stop signaling that it is prepared to connect to the input A so that it can signal that it will connect to the new high priority input B. Input A would then mask the data valid signal to output Z and unmask the data valid to the second best output Y option.

The connection mechanism ensures that if there are at least as many outputs as inputs and all outputs are able to accept data then all inputs will be able to find an output to connect with and all will be able to transmit data without any loss of bandwidth for any of the inputs. With this mechanism there is no need to withdraw the request in the hope of finding an output prepared to accept the request as there is with more traditional adaptive arbitration schemes where the adaptive selection is made by randomly selecting one of the outputs in the adaptive selection mask to connect with and then withdrawing the request after some time when the output refuses to connect. Withdrawing a request is a costly operation in time as the pipelined arbitration process requires the request to be de-asserted for at least the same number of cycles as the depth of the pipeline before it can be reasserted to request the new output.

It has already been stated that the arbiter must be fair to ensure good network performance. For a round robin arbiter this is achieved with the roaming priority mechanism already described. However the order the requestors appear in the priority ring shown in FIG. 3 does not need to be the same for all of the output round robin arbiters used to select inputs. If they are all identical then some undesirable effects can occur when they interact with the round robin arbiters of the adaptive input selection mechanism. This can be seen when all the inputs to the crossbar are using the same adaptive output selection masks. Typically all the inputs will be attempting to make adaptive selections at certain places within the network using the same output selection masks. If all the round robin arbiters are identical for all the outputs then they will make the same decisions for selecting the next input. In general this means that for all the requesting inputs one will have a positive connection from all the outputs it has requested and the other inputs will have no positive connections from any of the outputs. Clearly the first input will select one of the outputs to proceed with and then stop requesting on the other outputs. The other outputs will then select another input but if all the round robin arbiters are identical they will select the same next input. Again the new selected input will choose one output and the process moves on in a serial way with each new choice costing one or two cycles. In the worst case the last input could be made to wait for many cycles. This can be as high as 64 cycles in a 32 by 32 crossbar where each new selection costs 2 cycles.

However, if the order of all the output round robin arbiters is scrambled with respect to each other than each output will choose a different input after a conflict has occurred. For example, suppose a small crossbar has say 8 inputs 132*a* through to 132*h* and 8 outputs named 134*a* through to 134*h* as shown in FIG. 4. The round robin arbiter for output 134*a* could select from the inputs in the order 132*a*, 132*b*, 132*c*, 132*d*, 132*e*, 132*f*, 132*g*, 132*h* while 134*b* could select from the inputs in the order 132*a*, 132*c*, 132*e*, 132*g*, 132*b*, 132*d*, 132*f*, 132*h* and 134*c* could select from the inputs in the order 132*a*, 132*h*, 132*b*, 132*g*, 132*c*, 132*f*, 132*d*, 132*e*. The other outputs could also have a different round robin selection order from each other and the first three outputs. Then let us suppose that an adaptive request is being made simultaneously by all inputs 132*a* to 132*h* to all then outputs 134*a* to 134*h*. Initially all the outputs might choose to respond to input 132*a* and 132*a* would choose one of the outputs to complete the connection with. Without any round robin order scrambling all the other outputs would now choose input 132*b* however with the scrambling 134*a* would choose 132*b* but 134*b* would choose 132*c* and 134*c* would choose 132*h* and the other outputs would also choose a different input. As all the other inputs had been chosen by a different output they would all be able to complete their connections without any further delay. Scrambling the order of the output round robin arbiters can have a dramatic effect on the connection latency of many adaptively requesting inputs. For example, if short packets are connecting to the switch and for a 40 GbE switch this could be a new packet every 5 cycles a total bandwidth improvement of a factor of 10 has been observed by scrambling the order of the output round robin arbiters.

Scrambling the order of the output round robin arbiters does not affect their fairness it just changes the order of connections to the arbiter.

The connection mechanism as described with reference to the above embodiments, provides the best possible adaptive arbitration ensuring maximum bandwidth, minimum latency and the lowest possible maximum connection latency when transferring data across a network switch such as a crossbar network switch.

It will be appreciated that in each of the above embodiments of the connection mechanism, a connection is not completed until the first data has been transferred from the switch input, across the switch connection to the connected switch output. A switch input request is just a request to be connected to a particular output and the request may be accepted or denied. However, even if an input request is accepted by signaling that the output is prepared transfer a packet for an input, the acceptance does not have to be acted upon if a more suitable output becomes available prior to the commencement of data transfer. If a more suitable output does become available, the original acceptance can be ignored providing data transmission has not commenced on the original connection. Once the input has selected the output to send the data to and finalized the selection by sending the first data all other requests to outputs that were part of the adaptive request mask are de-asserted allowing those outputs to select another input if other inputs are still requesting.

The invention claimed is:

1. A network switch device for use in a data network, the switch device comprising:
 a plurality of input ports for receiving data packets,
 a plurality of output ports for transmitting data packets;
 a switch network comprising a plurality of interconnected switch elements arranged to enable connection of any of the input ports to any of the output ports, each switch element being operable to connect one of the input ports with one of the output ports,
 each output port including an output arbiter operable to determine which switch element is to connect an input port to that output port, the output arbiter being a round robin arbiter connected with those switch elements which are connected with the output port concerned;
 at least one input port including an input arbiter which is a round robin arbiter operable to determine which switch element or elements are to complete a connection from the input port concerned to an output port, the input arbiter further operable to select ports in turn in a predetermined order specific to the input arbiter, wherein the predetermined order is different from the respective predetermined orders of the other round robin arbiters within the switch element; and
 at least one input port being operable to transmit at least two switch request signals to at least two switch elements,
 wherein each output arbiter is operable to receive a switch request signal from a switch element connected with an associated output port, to determine to which input port the output port is to connect, in dependence upon such a received switch request signal and in turn in a scrambled order with respect to other round robin arbiters, the output arbiter to further signal connection status information via said switch elements to that input arbiter associated with said input port, the input arbiter being operable to select only one output port in dependence upon received connection status information, thereby to complete a single connection from said input port to a single output port.

2. A device as claimed in claim 1, wherein each input port includes route decode logic operable to determine a selection of outputs ports to which an incoming data packet can be routed, and to generate appropriate switch request signals from such a determined selection.

3. A device as claimed in claim 2, wherein each input arbiter is operable to select an output port for connection to the input port concerned.

4. A device as claimed in claim 1, wherein the output arbiter is operable to transmit an acceptance indicator value to the input arbiter, the input arbiter being operable to receive an acceptance indicator value, and to cause a switch element to connect the input port to the output port associated therewith.

5. A device as claimed in claim 1, wherein the switch network is operable to connect an input port to a single output port.

6. A device as claimed in claim 1, wherein the switch network is operable to connect input port to a plurality of the output ports.

7. A device as claimed in claim 6, wherein the switch network is operable to connect input port to all of the output ports.

8. A method of routing data packets in a data network which includes a switch device comprising a first plurality of input ports for receiving data packets, a second plurality of output ports for transmitting data packets, and a switch network comprising a third plurality of interconnected switch elements arranged to enable connection of any of the input ports to any of the output ports, each switch element being operable to connect one of the input ports with one of the output ports, each output port including an output arbiter operable to determine which switch element is to connect an input port to that output port, the output arbiter being a round robin arbiter being connected with those switch elements which are connected with the output port concerned, at least one input port including an input arbiter being a round robin arbiter operable to determine which switch element or elements are to complete a connection from the input port concerned to an output port, and, at least one input port being operable to transmit at least two switch request signals to at least two switch elements, the method comprising the steps of:

receiving, at the switch elements, a switch request signal from an input port of the switch device;

passing such received switch request signals to the output arbiters of the output ports to which the switch elements are connected;

receiving, at the output arbiters, a switch request signal from the switch elements connected with the associated output ports;

determining to which input port the output ports are to connect in dependence upon such received switch request signals, such determination being made in turn based upon a scrambled order;

returning connection status information via the associated switch elements to that input arbiter associated with said input port; and selecting, using an input arbiter, only one output port in dependence upon such received connection status information to complete a single connection from said input port to a single output port, wherein such selection is made in turn using a predetermined order specific to the input arbiter, wherein the predetermined order is different from a predetermined order used by any alternate arbiters within the switch element.

9. A method as claimed in claim 8, wherein each input port includes input adaptive route decode logic, and wherein the method further comprises determining a selection of outputs ports to which an incoming data packet can be routed, and generating appropriate switch request signals from such a determined selection.

10. A method as claimed in claim 9, further comprising selecting an output port for connection to the input port concerned.

11. A method as claimed in claim 9 or 10, further comprising transmitting an acceptance indicator from an output arbiter to the input arbiter, receiving the acceptance indicator value at the input arbiter, and connecting the input port to the output port associated therewith.

12. A method as claimed in claim 8, comprising connecting an input port to a single output port.

13. A method as claimed in claim 8, comprising connecting an input port to a plurality of the output ports.

14. A method as claimed in claim 8, comprising connecting an input port to all of the output ports.

* * * * *